Patented Oct. 10, 1933

1,929,786

UNITED STATES PATENT OFFICE 1,929,786

PREPARATION OF CHONDROITIN COMPOUNDS

Arthur E. Meyer, Rockford, Ill., assignor to Chappel Brothers, Inc., Rockford, Ill., a corporation of Delaware No Drawing. Application March 20, 1933
Serial No. 661,792

9 Claims. (Cl. 260—10)

The present invention relates to an improved process for the manufacture of chondroitin compounds of a state of purity sufficient to permit their use for medicinal purposes.

One of the objects of the invention is to simplify the manufacture of chondroitin compounds from cartilage so as to avoid the tedious and expensive cleansing operations that are now necessary before the said cartilage can be employed for the manufacture of chondroitin compounds, so that it becomes possible to employ cartilage that carries adherent proteid matter without having the latter interfere seriously with the extraction of the chondroitin-containing matter from the cartilage.

A further object of the invention is to treat cartilage carrying adhering proteid matter, such as flesh, with a reagent having an insolubilizing effect, so that said proteid matter is thereby rendered substantially immune to the effects of an alkaline solution, and thereupon to treat the cartilage with an alkaline extracting agent.

A further object of the invention is to treat cartilage with a dilute solution of formaldehyde so as to insolubilize the proteid matter therein contained and adhering thereto, and then to extract the cartilage with a solution of an alkali, purifying the solution thus obtained and eventually recovering the desired chondroitin compound therefrom.

Other objects of the invention will become apparent from the description and claims hereinbelow.

The invention is an improvement in the method of preparing chondroitin compounds, specifically chondroitin-sulfuric acid, described in the prior art, in that it enables the manufacture of sufficiently pure compounds for medicinal use, in a more direct and inexpensive manner.

Chondroitin-sulfuric acid is a complex organic body containing the following groups: hexosamine, glucuronic acid, acetyl, and sulfuric acid. Its probable formula is:

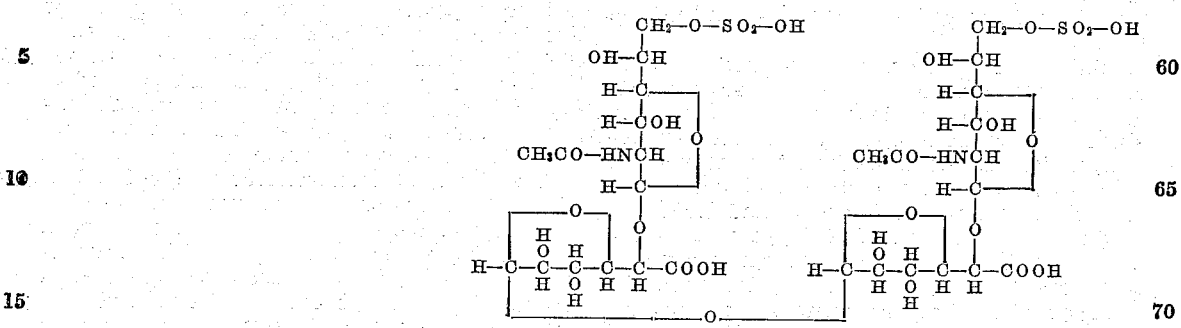

and when sufficiently purified it appears in the form of a whitish light powder, practically non-hygroscopic, of faintly acid taste, and capable of combining with metals to form fairly well defined salts.

The methods hitherto employed for the preparation of this substance were rather involved and required the use of a relatively large amount of various reagents, so that the cost of the final product was quite high. By the method of the present invention, however, the manufacture of the chondroitin compounds is much simplified, and the products can therefore be manufactured at a reasonable cost. As these products are now being more and more widely used in the treatment of various diseases and dysfunctions, such as migraine, peptic ulcers, urticaria and the like, the invention is of great practical value.

Without limiting the present invention in any way, a preferred embodiment thereof will now be described. The raw material employed is animal cartilage, such as that derived from the nasal septa of cattle, horses and similar animals. For example, the cartilage is roughly cleansed of adhering meaty tissue and is then treated as follows: 100 pounds of the cartilage are covered with 10 gallons of water to which there has been added 400 milliliters of formaldehyde solution (U. S. P. formalin, containing about 37% of absolute $CH_2O$), and the mixture is allowed to stand at ordinary atmospheric temperature for about two days. The result of this treatment is to insolubilize substantially completely the adhering proteid and meaty matter associated with the cartilage. At the end of the stated period as much as possible of the formaldehyde solution is drained from the cartilage, which is then thoroughly rinsed with water to remove any loose debris and to wash away the formaldehyde and adherent dissolved matter. The cartilage is then, without drying, ground up in a powerful meat grinder to form a granular comminuted material. The entire yield of material thus obtained from the original 100 pounds of cartilage is then treated with 1000 grams (2.2 pounds) of commercial caustic soda (NaOH, containing 76% of actual Na₂O) which have been dissolved in sufficient water to constitute a 2½% solution of NaOH. This caustic soda solution is allowed to act upon the comminuted cartilage for about two days at ordinary room temperature, whereupon the resultant solution is drained off and the residual cartilage is subjected to pressure to remove as much as possible of the solution. The solution thus drained off is combined with that extracted by the pressure, and then the combined solutions are acidified with acetic acid, sufficient of the latter being used to insure a reaction acid to litmus. This acidification produces a slight precipitate which is removed from the solution either by allowing it to subside and pouring off the solution or by filtering the solution by any suitable means.

While the alkaline extraction of cartilage when carried out according to the prior art methods almost invariably produced partly decomposed and unpleasant smelling solutions, caused by decomposition of the proteid matter during the extraction period, the solutions obtained by the present process are much cleaner and are devoid of any unpleasant smell. It appears that the formaldehyde treatment renders the meaty particles and other proteids associated with the cartilage substantially resistant to decomposition or solution by the caustic soda solution, so that only the desired chondroitin compounds of the cartilage are dissolved by the said solution. This is a very important consideration, for the final products are used medicinally, and it is therefore very desirable to have a product that is not distasteful to the patient, as the products are almost invariably administered per os.

The slightly acid filtrate obtained in accordance with the process as thus far described is then treated with an adsorbing agent such as animal charcoal, charcoal, activated carbon, silica-gel or the like, together with an inert filter-aid such as "Super-cel" which will entangle any precipitate and allow more ready and easier filtration of the material. Preferably, the charcoal, etc. and the filter-aid are stirred into the solution and allowed to remain suspended therein for a few hours. The effect of the adsorbing agent is to remove from the solution certain dissolved organic materials, the nature of which is not definitely determinable but whose presence is not desired in the final product. Without removing the charcoal or other added material, the suspension is treated with a slight excess of calcium carbonate, preferably in the form of a powder such as precipitated chalk or ground chalk, whereby the slight excess of acetic acid is neutralized with the formation of calcium acetate. The suspension is tested with litmus paper, or a similar indicator, and when substantially neutral is filtered. The clear filtrate thus obtained contains the desired end product, namely the chondroitin compound, mainly in the form of the sodium and calcium compound of chondroitin-sulfuric acid, as well as some free chondroitin-sulfuric acid.

To recover the end-product, the aforesaid filtrate is poured into three or more volumes of 90% ethyl alcohol, which may be either of the pure variety or one denatured with a non-poisonous denaturant. Alcohol that has been denatured with acetone gives excellent results. Alternatively, methyl alcohol, or a mixture of ethyl and methyl alcohol may be employed. On pouring the said filtrate into the alcohol, a flocculent whitish precipitate of the desired end-product is obtained. On analysis it will be found that this consists essentially of the sodium salt of, the calcium salt of, and some free chondroitin-sulfuric acid. This precipitate is then filtered off in any desired known way and is then dried by means of warm air or in vacuo, and finally ground into a powder.

In this form it may be packaged for use.

While calcium carbonate has been specifically mentioned as the means for neutralizing the solution that is slightly acid with acetic acid, it is to be understood that other neutralizing means may be employed in lieu thereof, such for example as sodium carbonate, sodium bicarbonate, lithium carbonate, lithium bicarbonate, calcium hydroxide, potassium hydroxide or carbonate or bicarbonate and similar alkalies, care being taken when these soluble alkalies are used not to render the solution alkaline but to test the same and to cease adding the neutralizing agent when the solution is substantially neutral, i. e., when it has a hydrogen-ion concentration of pH 7.0.

The filtrate obtained when filtering off the final product contains the alcohol used for effecting the precipitation, as well as soluble acetates such as calcium acetate or the acetates of the particular alkali employed, when such latter is used in place of the calcium carbonate. The recovery of the alcohol from such filtrate and the recovery of the salts is not within the scope of the present invention, but obviously these materials may be recovered if desired.

While formaldehyde has been specifically mentioned as the reagent employed for the insolubilization of the proteid materials as the first step in the present process, it is to be understood that other soluble aldehydes may be employed in its place. Thus, acetaldehyde will yield substantially equivalent results. Because of its cheapness, however, formaldehyde is preferred.

I claim:

1. The process of producing chondroitin compounds which comprises the steps of treating cartilage with a water-soluble aldehyde to insolubilize proteid matter associated with the said cartilage, and thereupon extracting said cartilage with an alkaline solution.

2. The process of producing chondroitin compounds which comprises the steps of treating cartilage with a solution of formaldehyde to insolubilize proteid matter associated with the said cartilage, and thereupon extracting said cartilage with an alkaline solution.

3. The process as defined in claim 1, wherein the alkali is sodium hydroxide.

4. The process of producing chondroitin compounds which comprises treating cartilage with an aqueous solution of an aldehyde, comminuting said cartilage after withdrawing the resultant liquid, treating the cartilage with a solution of an alkali to dissolve chondroitin compounds therefrom, separating the resulting alkaline solution from the cartilaginous remains and acidifying the solution, filtering the thus obtained acid solution from any precipitated organic debris, treating the filtrate thus obtained with an adsorbent, neutralizing the filtrate while still in contact with said adsorbent, filtering the adsorbent from the filtrate to obtain a clarified neutral filtrate and pouring the latter into more than twice its volume of a water-miscible alcohol to precipitate the desired chondroitin compound, and recovering the latter.

5. The process as defined in claim 4 wherein the aldehyde is formaldehyde.

6. The process as defined in claim 4 wherein the neutralizing agent is calcium carbonate.

7. The process as defined in claim 4 wherein the alcohol employed for precipitation of the chondroitin compound is ethyl alcohol.

8. In the process of obtaining chondroitin compounds from cartilage, the step which comprises treating said cartilage to insolubilize any proteid matter associated therewith.

9. The process of preparing chondroitin compounds from cartilage which comprises treating said cartilage with an aqueous solution of formaldehyde in the cold, removing the resultant solution, grinding the thus treated cartilage and extracting the same with a solution of sodium hydroxide, separating the resulting alkaline-reacting solution from the cartilage and acidifying the same with acetic acid whereby a precipitate is formed, removing the precipitate from the solution and adding to the thus clarified solution an adsorbing agent from the group consisting of charcoal, animal charcoal, activated carbon and silica-gel, allowing the solution and adsorbing-agent to stand at room temperature for some time to adsorb undesired organic constituents contained in said solution, neutralizing the solution while still containing said adsorbent with calcium carbonate in slight excess, filtering the solution from adsorbent and calcium carbonate, pouring the thus obtained neutral filtrate into three volumes of alcohol to precipitate the desired chondroitin compounds, and recovering the latter from the solution, and drying the same.

ARTHUR E. MEYER.